United States Patent Office 3,849,396
Patented Nov. 19, 1974

3,849,396
LINCOMYCIN AND CLINDAMYCIN 1-O-ETHERS
Robert D. Birkenmeyer, Galesburg, Mich., assignor to
The Upjohn Company, Kalamazoo, Mich.
No Drawing. Filed Jan. 8, 1973, Ser. No. 321,957
Int. Cl. C08b 19/00
U.S. Cl. 260—210 R                    27 Claims

ABSTRACT OF THE DISCLOSURE

Novel derivatives of lincomycin and clindamycin are disclosed having the general formula:

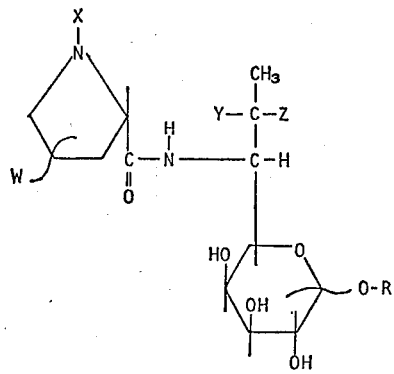

wherein W represents hydrogen and lower alkyl; X is hydrogen, lower alkyl and hydroxy-substituted alkyl of two to four carbon atoms, inclusive; Y is hydrogen and hydroxyl; Z represents hydrogen when Y is hydroxyl and when Y is hydrogen Z represents hydrogen and halogen; R is lower alkyl, lower cycloalkyl, lower aryl, lower aralkyl, halogen substituted lower alkyl; halo-, nitro-, and amino-substituted lower aryl; halo-, nitro-, amino- and hydroxy-substituted lower aralkyl; nitrogen, sulfur, or oxygen-containing heterocycles; and acid addition salts thereof. The novel derivatives are useful anti-bacterial agents.

BACKGROUND OF THE INVENTION (1) Field of the invention

The invention concerns novel derivatives of lincomycin and clindamycin and more particularly concerns 1-demethylthio-1-O-substituted lincomycins and 1-demthyl-thio-1-O-substituted clindamycins.

(2) Description of the prior art

Lincomycin was previously described; see, for example, U.S. Pat. 3,366,624. Clindamycin was also previously described; see, for example, U.S. Pat. 3,435,025.

SUMMARY OF THE INVENTION

The invention comprises a compound selected from those of the formula:

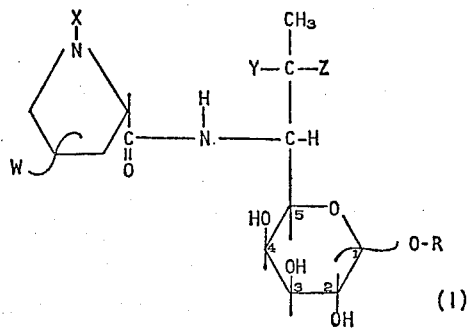

and the acid addition salts thereof, wherein W is selected from hydrogen and lower alkyl; X is selected from hydrogen, lower alkyl and hydroxy-substituted alkyl of from two to four carbon atoms, inclusive; Y is selected from hydrogen and hydroxyl; Z is hydrogen when Y is hydroxyl and when Y is hydrozen Z is selected from hydrogen, chlorine, bromine and iodine; R is selected from lower alkyl, lower cycloalkyl, lower aryl, lower aralkyl, halo-substituted lower alkyl; halo-, nitro- and amino-substituted lower aryl; halo-, nitro-, amino- and hydroxy-substituted lower aralkyl; and a monovalent moiety of formula:

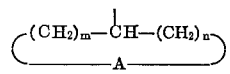

wherein A represents one of the divalent groups

—S—, and —O—; $m$ and $n$ are each integers of from 0 to 4, inclusive, and are such that the sum of $m+n$ is from 3 to 4.

The wavy line connecting W to the body of the molecule represented by formula (I) indicates that the group W may be in either the cis (below the plane of the ring) or trans (above the plane of the ring) position. The wavy line connecting the group —O—R to the body to the molecule represented by formula (I) indicates that the moiety —O—R may be in either the alpha (below the plane of the ring) or beta (above the plane of the ring) position.

Preferred compounds of the formula (I) are those wherein W is propyl, X is methyl, Y is selected from hydrogen and hydroxyl; Z is hydrogen when Y is hydroxyl and when Y is hydrogen Z is selected from chlorine, bromine, and iodine; R is selected from lower alkyl, lower aralkyl and halogen substituted lower alkyl. Particularly preferred for their antibacterial activity are those compounds of Formula (I) wherein R is alkyl of 6 to 8 carbon atoms, inclusive, aralkyl of 6 to 8 carbon atoms, inclusive, and halogen substituted alkyl of 6 to 8 carbon atoms, inclusive.

The term "lower alkyl" as used throughout the specification and claims means alkyl having from 1 to 12 carbon atoms, inclusive, as illustrated by alkyl groups such as methyl, ethyl, propyl, butyl, pentyl, hexyl, heptyl, octyl, nonyl, decyl, undecyl, dodecyl, and isomeric forms thereof.

The term "hydroxy-substituted alkyl of from two to four carbon atoms, inclusive" as used herein means alkyl as defined above having the stated carbon content and wherein a hydrogen atom has been replaced with a hydroxyl group. Illustrative of hydroxy-substituted alkyl of from two to four carbon atoms, inclusive, are hydroxyethyl, hydroxypropyl, hydroxybutyl and isomeric forms thereof.

The term "lower cycloalkyl" as used herein means cycloalkyl having from 4 to 8 carbon atoms, inclusive, as illustrated by cycloalkyl groups such as cyclobutyl, cyclopentyl, cyclohexyl, cycloheptyl, and cyclooctyl.

The term "lower aryl" as used herein means aryl having from 6 to 12 carbon atoms, inclusive, as illustrated by aryl groups such as phenyl, tolyl, xylyl, naphthyl, biphenylyl and the like.

The term "lower aralkyl" is used herein as meaning aralkyl having from 7 to 12 carbon atoms, inclusive, as illustrated by aralkyl groups such as benzyl, phenethyl, phenpropyl, phenbutyl, phenpentyl, phenhexyl, tolethyl and the like.

The term "halo-substituted lower alkyl" as used throughout the specification and claims means lower alkyl as defined above wherein one or more hydrogen atoms have been replaced by halogen such as bromine, chlorine, iodine and fluorine. Illustrative of halo-substituted alkyl are chloromethyl, 1,2-dibromoethyl, 1,2-diiodobutyl, 1,1,2,2-tetrafluorohexyl, and the like.

The term "halo-, nitro-, and amino-substituted lower aryl and halo-, nitro-, amino- and hydroxy-substituted lower aralkyl" as used herein means lower aryl or lower aralkyl as defined above wherein a hydrogen atom located on the aromatic ring has been replaced by a halogen, nitro group, amino group or additionally in the instance of lower aralkyl, a hydroxyl group, respectively. Illustrative of halo-, nitro- and amino-substituted lower aryl and halo-, nitro-, amino- and hydroxy-substituted lower aralkyl are p-bromophenyl, m-dichlorophenyl, p-nitrophenyl, p-aminophenyl, dibromophenethyl, p-nitrobenzyl, p-aminobenzyl, m-hydroxyphenethyl and the like.

The invention also comprises methods of preparing and using the compounds (I) of the invention and the acid addition salts thereof.

The compounds (I) and the acid addition salts thereof possess antibacterial activity, exhibiting a spectrum of antimicrobial activity similar to that of the well-known lincomycins and clindamycins (see for example U.S. Pats. 3,086,912 and 3,539,689). As antibacterial agents they are useful, for example, in aqueous solutions and suspensions at a concentration of from about 1.0 percent to about 10.0 percent by weight for disinfecting surgical, medical, laboratory, hospital and food processing equipment.

DETAILED DESCRIPTION OF THE INVENTION

The compounds (I) of the invention are prepared by demercaptalation of the corresponding 1-thioglycoside of formula:

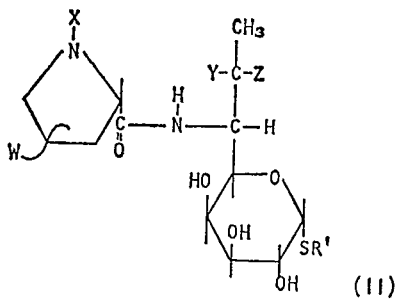

or an acid addition salt thereof, wherein W, X, Y, Z and the wavy line to W have the meanings previously assigned to them; R' is alkyl of 1 to 20 carbon atoms, inclusive; and etherification of the demercaptalated compound (II) with an alcohol of formula:

R—OH            (III)

wherein R is as defined previously.

Demercaptalation of the compounds (II) is accomplished by conventional techniques, such as by reacting the 1-thioglycoside (II) with an equimolar proportion of bromine in the presence of an inert organic solvent. The alcohol reactant (III) is then added to the reaction mixture obtained upon demercaptalation of the 1-thioglycoside (II), whereby the compounds (I) of the invention are obtained.

In an alternative and preferred procedure, the starting 1-thioglycosides (II) or the acid addition salts thereof are first admixed with the solvent and alcohol reactant (III). Bromine is then added to the resulting mixture so as to obtain the desired compounds (I) of the invention in a single step reaction. The reaction which occurs is conveniently illustrated by the schematic formula:

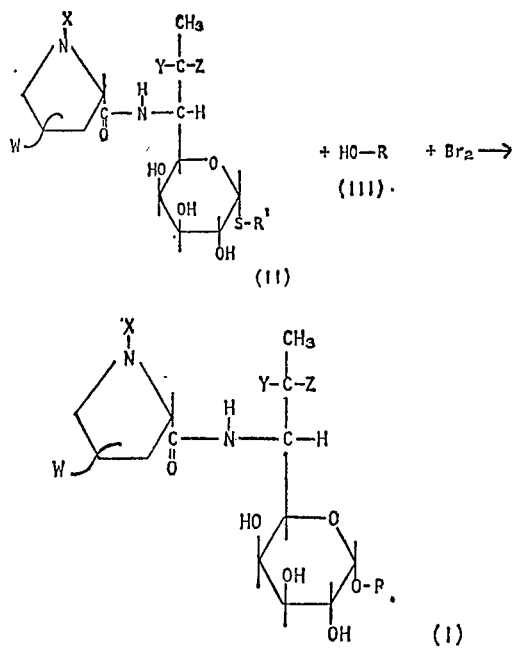

wherein W, X, Y, Z, R, R' and the wavy line to W have the meanings previously assigned to them.

The proportion of reactants employed in the above described preparations is not critical. Generally, stoichiometric proportions are employed, i.e., substantially equimolar. Advantageously, a slight excess, i.e., from about 5 percent to about 20 percent molar excess of bromine over the 1-thioglycoside reactant (II) is employed.

Demercaptalation of (II) by reaction with bromine is carried out within a temperature range of from about −10° C. to about reflux temperature for the reaction mixture. Preferably, the reaction is carried out at a temperature of from about 0° C. to about 50° C. The reaction is exothermic and temperature is maintained within desired limits by cooling the reaction mixture, or alternatively by the slow and gradual addition of bromine reactant. Reaction of the demercaptalated compound (II) with the alcohol reactant (III) is carried out within a temperature range of from about 0° C. to reflux temperature for the reaction mixture.

In the preferred single step reaction described above, the reaction is carried out within a temperature range of from about 0° C. to about reflux temperature for the reaction mixture and preferably within a temperature range of from about 25° C. to about 50° C. Again, the reaction occurring upon addition of bromine is exothermic and temperature is conveniently controlled by cooling the reaction mixture or by the gradual addition of bromine.

Demercaptalation of the 1-thioglycoside (II) is generally complete within minutes of the completion of bromine addition. The etherification step is generally complete within one-quarter to 24 hours depending upon temperature and the nature of the specific reactants of formulae (II) and (III) employed. The preferred one-step procedure described above is generally also complete within one-quarter to 24 hours depending on temperature employed and the nature of the reactants.

Progress of the above described reactions may be monitored by conventional analytical techniques such as for example, thin-layer chromatography. The disappearance of starting compounds (II) from the reaction mixture is indicative of completion of the reactions, as is the appearance of new compounds of the formula (I) in the reaction mixture.

Upon completion of the above described preparative reactions, the product compounds (I) of the invention are conveniently separated from the reaction mixture by conventional methods, such as for example by solvent extraction, crystallization, chromatographic techniques, countercurrent distribution and like methods.

In the preferred one-step reaction procedure, the initial compounds of formula (I) formed in the reaction mixture are those wherein the —O—R group at the 1 carbon position is in the alpha position. If the product compounds (I) are immediately separated from the reaction mixture, those of the alpha-1-position are obtained substantially free of the corresponding beta anomer. If the alpha anomer is permitted to remain in the reaction mixture for extended periods, i.e., for about one to about sixty hours, substantial isomerization to the beta configuration occurs and there is obtained a mixture of the two anomers. The exact time required for substantial isomerization will vary depending upon the nature of the group-R in the compound (I) being prepared. The two anomers are separable if desired by chromatographic methods. Both anomers are useful antibacterial agents alone or in admixture.

The term "inert organic solvent" as used herein means an organic solvent which will at least partially solubilize the starting compounds (II) and which does not enter into or in any way alter the desired course of the reaction. Illustrative of inert organic solvents are ether, chloroform, tetrahydrofuran, methylene chloride, carbon tetrachloride, dioxane and like oganic solvents. In the preferred one-step procedure described above, an excess of the reactant alcohol (III) over that proportion required for reaction with the compound (II) may be employed as the inert organic solvent. This use of alcohols (III) as solvents is in fact a preferred embodiment of the process of preparing compounds (I) of the invention.

Reactant alcohols (III) employed in preparing the compounds of the invention (I) are a well-known class of alcohols as is their preparation. In general, they are characterized by their non-reactivity with bromine under the conditions described above for preparing the compounds (I).

Illustrative of alcohols (III) are the alkanols such as methanol, ethanol, 2-propanol, 1-butanol, 2-methyl-2-propanol, 1-pentanol, t-amyl alcohol, 1-hexanol, 4-methyl-2-pentanol, 2-ethyl-1-butanol, 1-heptanol, 2,3-dimethyl-2-pentanol, 3-methyl-2-ethyl-1-butanol, 1-octanol, 2,4-dimethyl-3-hexanol, 2,2,3,3-tetramethyl-1-butanol, 5-nonanol, 2,2-dimethyl-1-heptanol, 1-decanol, 1-undecanol, dodecyl alcohol and the like; alicyclic alcohols such as cyclobutanol, cyclopentanol, cyclohexanol, cycloheptanol, cyclooctanol and the like; aromatic alcohols such as phenol; o-, m-, and p-cresol, p-ethylphenol, xylenol, p-t-butylphenol, β-naphthol, p-phenylphenol and the like; aralkyl alcohols such as benzyl alcohol, β-phenylethanol, 3-phenyl-1-propanol, 3-phenyl-1-butanol, 5-phenyl-1-pentanol, β-(1-naphthyl)-ethyl alcohol and the like; halogenated alkanols such as 1-chloro-2-ethanol, 1-bromo-2-propanol, 1-iodo-4-butanol and the like; substituted aromatic alcohols such as p-bromophenol, m-nitrophenol, p-amino phenol, p-chlorobenzyl alcohol, m-nitrobenzyl alcohol, p-aminobenzyl alcohol, p-hydroxybenzyl alcohol and the like; heterocyclic alcohols such as 3-hydroxypyrrolidine, 3 - hydroxytetrahydrofuran, 3 - hydroxytetrahydrothiophene, 1-methyl-3-hydroxypiperidine, β-piperidylcarbinol, 4-hydroxytetrahydropyran, 4-hydroxytetrahydrothiopyran and the like.

Lincomycin and clindamycin starting compounds (II) and acid addittion salts thereof employed in preparing the compounds (I) of the invention are a well-known class of compounds as is their preparation. For example, the preparation of the compounds (II) and salts thereof wherein Y is specifically hydroxyl and Z is specifically hydrogen is taught in U.S. Pat. 3,366,624. The preparation of compounds (II) and acid addition salts thereof wherein Y is specifically hydrogen and Z is specifically hydrogen or halogen is taught in U.S. Pats. 3,435,025 and 3,496,163. The method of preparing compounds (II) wherein X is specifically hydroxyethyl is taught in copending application Ser. No. 156,099 filed June 23, 1971, now Pat. No. 3,787,390. Employing the same method of application Ser. No. 156,099 but replacing the ethylene oxide as used therein with propylene oxide or butylene oxide, hydroxyl-substituted alkyl of 3 and 4 carbon atoms, respectively, are obtained.

The novel compounds (I) of the invention exist either in the non-protonated (free base) form or in the protonated (acid addition salt) form, depending on the pH of the environment. They form stable protonates, i.e., acid addition salts, on neutralization of the free base with suitable acids. Salts of the compounds (I) are made by neutralizing the free base with the appropriate acid to below about pH 7.0 and advantageously to about pH 2 to pH 6. Suitable acids for this purpose include hydrochloric, sulfuric, phosphoric, thiocyanic, fluosilicic, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicyclic, 5-phenylsalicyclic, 3-methylglutaric, orthosulfobenzoic, cyclohexanesulfamic, cyclopentanepropionic, 1,3-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfuric, picric and like acids. Conversely, the free base of compounds (I) are obtained from the corresponding salt, for example from the hydrochloride or sulfate salt, by dissolving or suspending the salt in buffer at about pH 5 to 7, preferably about pH 6, extracting with an immiscible organic solvent, for example chloroform, drying the extract, for example with anhydrous sodium sulfate, and removing the solvent by evaporation.

Acid addition salts of the compounds (I) of this invention can be used for the same purpose as the free bases. They can also be used to upgrade the free bases, namely, by making acid addition salts of the free bases, subjecting them to purification procedures and then converting the salts back to the free bases by neutralizing with an alkali or contacting with an anionic resin, advantageously to about pH 7.5 to 8.5.

The following examples describe the manner and process of making the invention, and set forth the bast mode contemplated by the inventor of carrying out the invention but are not to be construed as limiting.

EXAMPLE 1

An appropriate reaction vessel is charged with 23 grams (0.05 moles) of 7(S)-chloro-7-deoxylincomycin hydrochloride (prepared according to Preparation 1. (B) of U.S. Pat 3,435,025) and 100 ml. of methanol. The mixture is stirred continually while 8 ml of bromine is added dropwise thereto over a period of about 10 minutes. After standing at a temperature of about 25° C. for about 18 hours, excess methanol is removed by distillation under reduced atmospheric pressure and the residue dissolved in 500 ml. of water. The resulting aqueous solution is extracted with ether and the aqueous phase adjusted to a pH crica 7.0 by the addition of sodium bicarbonate. The resulting neutral solution is extracted three times with 100 ml. portions of chloroform. The combined extracts are evaporated under vacuum and the residue is chromatographed on 2 kilograms of silica gel (Merck 0.05-0.2 mm.) using chloroform:methanol (6:1 v./v) as the eluting solvent system. Product fractions of 55 ml. each are collected. Fractions No. 65 through No. 85 are combined and evaporated under vacuum. The residue which is methyl 7(S)-chloro-6,7,8-trideoxy-6-(1-methyl-trans-4-propyl - L - 2 - pyrrolidinecarboxamido)-L-threo - α - D-galacto-octopyranoside free base, is then dissolved in about 1 liter of ether and gaseous hydrogen chloride is bubbled into the resulting solution. A precipitate appears, which is removed by filtration and dried to obtain 11.0 grams (50 percent of theory) of methyl 7(S) - chloro - 6,7,8 - trideoxy-6-(1-methyl-trans-4-propyl - L - 2 - pyrrolidinecarboxamido) - L-threo-α-D-galacto-octopyranoside in the form of its hydrochloride salt.

*Analysis.*—Calc'd for $C_{18}H_{33}ClN_2O_6 \cdot HCl$ (percent): C, 48.54; H, 7.69; N, 6.29; Cl, 15.92. Found (percent): C, 47.86; H, 8.21; N, 6.26; Cl, 15.75. $[\alpha]_D^{25} = +20°$ (1% in $H_2O$).

EXAMPLE 2

An appropriate reaction vessel is charged with 23 grams (0.05 moles) of 7(S)-chloro-7-deoxylincomycin hydrochloride (prepared according to Preparation I. (B) of U.S. Pat. 3,435,025), and 100 ml. of ethanol. The mixture is stirred continually and cooled to a temperature of circa 0° to 10° C. while 8 ml. of bromine is added dropwise thereto over a period of about two hours. At the end of this period, excess ethanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100 ml. portions of chloroform. The combined extracts are dried over anhydrous magnesium sulfate and evaporated under vacuum and the residue is chromatographed on two kilograms of silica gel (Merck 0.05–0.2 mm.) using chloroform:methanol (6:1 v./v.) as the eluting solvent system. Product fractions of 55 ml. each are collected. Fractions No. 66 through No. 86 are combined and evaporated under vacuum. The residue which is ethyl 7(S)-chloro-6,7,8-trideoxy-6-(1-methyl-trans-4-propyl-L-2-pyrrolidinecarboxamido) - L - threo - α - D - galacto-octopyranoside free base, is then dissolved in about 100 ml. of water and the pH of the solution adjusted to about 3.0 by the addition of concentrated hydrochloric acid. The acidic solution is lypholyzed. The resulting white solid is 6.0 grams (25 percent of theory) of ethyl 7(S)-chloro-6,7,8-trideoxy-6-(1 - methyl - trans - 4 - propyl - L - 2 - pyrrolidinecarboxamido) - L - threo - α - D - galacto-octopyranoside in the form of its hydrochloride salt.

*Analysis.*—Calc'd for $C_{19}H_{35}ClH_2O_6 \cdot HCl$ (percent): C, 53.95; H, 8.34; N, 6.62; Cl, 8.38. Found (percent): C, 53.35; H, 8.06; N, 6.41; Cl, 8.01. $[\alpha]_D^{25} = +67°$ (1% in $H_2O$).

EXAMPLE 3

An appropriate reaction vessel is charged with 23 grams (0.05 moles) of 7(S)-chloro-7-deoxylincomycin hydrochloride (prepared according to Preparation I. (B) of U.S. Pat. 3,435,025) and 100 ml. of 2-chloro-ethanol. The mixture is stirred continually while 8 ml. of bromine is added dropwise thereto over a period of about ten minutes. After standing at a temperature of about 25° C. for about 18 hours, excess 2-chloroethanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are evaporated under vacuum and the residue is chromatographed on one kilogram of silica gel (Merck 0.05–0.2 mm.) using ethyl acetate:acetone:water (8:5:1 v./v./v.) as the eluting solvent system. Product fractions of 20 ml. each are collected. Fractions No. 95 through No. 115 are combined and evaporated under vacuum. The residue (wt. 9.5 grams) is a mixture of the anomers 2 - chloroethyl 7(S)-chloro-6,7,8-trideoxy-6-(1-methyl-trans-4-propyl-L-2-pyrrolidinecarboxyamido) - L-threo-α-D-galacto-octopyranoside free base and 2-chloro-ethyl 7(S)-chloro-6,7,8-trideoxy-6-(1-methyl-trans-4-propyl-L-2-pyrrolidinecarboxamido) - L - threo-β-D-galacto-octopyranoside free base. The mixture of anomers is chromatographed over two kilograms of silica gel using ethyl acetate:acetone:water (8:5:1 v./v./v.) as the eluting solvent to obtain the separate anomer components of the mixture. Collecting-25 ml. fractions from the chromatographed column, one isomer is obtained in fractions No. 132 through No. 139 and the other isomer in fractions No. 163 through No. 180. Upon removal of solvent, the separate anomers are obtained as the free bases in a dry solid form. Structures of the product compounds are confirmed by nuclear magnetic resonance analysis, mass spectral analysis and conversion to the corresponding hydrochloride salts. The corresponding hydrochloride salts are obtained by separately dissolving the separate free bases or the mixture of anomers when separation is not required, in one liter of ether and bubbling gaseous hydrogen chloride into the resulting solutions. The desired hydrochloride salts appear as precipitates in the solutions. The precipitated salts are readily separated from the mixture by filtration.

The identity of the hydrochloride salts is confirmed by elemental analysis.

EXAMPLE 4

An appropriate reaction vessel is charged with 11.5 grams (0.025 moles) of 7(S)-chloro-7-deoxylincomycin hydrochloride (prepared according to Preparation I. (B) of U.S. Pat. 3,435,025), and 100 ml. of n-butanol. The mixture is stirred continually while 8 ml. of bromine water is added dropwise thereto over a period of about ten minutes. After standing at a temperature of about 25° C. for about 18 hours, excess n-butanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are evaporated under vacuum and the residue is chromatographed on 600 grams of silica gel (Merck 0.05–0.2 mm.) using ethyl acetate:acetone:water (8:5:1 v./v./v.) as the eluting solvent system. Product fractions of 38 ml. each are collected. Fractions No. 28 through No. 34 are combined and evaporated under vacuum. The residue which is n-butyl 7(S)-chloro-6,7,8-trideoxy-6-(1-methyl-*trans*-4-propyl-L-2-pyrrolidinecarboxamido)-L - *threo* - α-D-galacto-octopyranoside free base, is then dissolved in about one liter of ether and gaseous hydrogen chloride is bubbled into the resulting solution. A precipitate appears which is then removed by filtration and dried to obtain 3.0 grams (25 percent of theory) of n-butyl 7(S)-chloro-6,7,8-trideoxy-6-(1-methyl-*trans*-4-propyl-L - 2 - pyrrolidinecarboxamido)-L-*threo*-α-D - galacto - octopyranoside in the form of its hydrochloride salt.

*Analysis.*—Calc'd for $C_{21}H_{39}ClN_2O_6 \cdot HCl$ (percent): C, 51.74; H, 8.27; N, 5.75; Cl, 14.55. Found (percent): C, 52.16; H, 8.29; N, 5.61; Cl, 14.56. $[\alpha]_D^{25} = +25°$ (1% in $H_2O$).

Similarly, following the above procedure but replacing the n-butanol as used therein with an equal molar proportion of cyclobutanol and cyclooctanol, respectively, there is obtained cyclobutyl 7(S)-chloro-6,7,8-trideoxy-6-(1-methyl-*trans*-4-propyl-L-2 - pyrrolidinecarboxamido) - L-*threo*-α-D-galacto-octopyranoside and cyclooctyl 7(S)-chloro-6,7,8-trideoxy-6-(1-methyl-*trans*-4-propyl - L - 2-pyrrolidinecarboxamido)-L-*threo*-α-D - galacto - octopyranoside, respectively, and their respective hydrochloride salts.

EXAMPLE 5

An appropriate reaction vessel is charged with 23 grams (0.05 moles) of 7(S)-chloro-7-deoxylincomycin hydrochloride (prepared according to Preparation I. (B) of U.S. Pat. 3,435,025) and 100 ml. of isobutanol. The mixture is stirred continually while 8 ml. of bromine is added dropwise thereto over a period of about ten minutes. After standing at a temperature of about 25° C. for 18 hours, a white precipitate forms which is collected and dissolved in 500 ml. of water. The pH is adjusted to 7 by the addition of sodium bicarbonate and the aqueous solution then extracted with chloroform. The chloroform extract is evaporated by dryness under vacuum. The residue which is isobutyl 7(S)-chloro-6,7,8-trideoxy-6-(1-methyl-trans - 4- propyl-L-2-pyrrolidinecarboxamido) - L - threo - α - D-galacto-octopyranoside free base, is then dissolved in about one liter of ether and gaseous hydrogen chloride is bubbled into the solution. A precipitate appears which is then removed by filtration and dried to obtain ten grams (45 percent of theory) of isobutyl 7(S)-chloro-6,7,8-trideoxy-6-(1-methyl-trans-4-propyl-L - 2 - pyrrolidinecarboxamido)-L-threo-α-D - galacto - octopyranoside in the form of its hydrochloride salt.

*Analysis.*—Calc'd for $C_{21}H_{39}ClN_2O_6 \cdot HCl$ (percent): C, 51.74; H, 8.27; N, 5.75; Cl, 14.55. Found (percent): C, 50.83; H, 8.31; N, 5.57; Cl, 13.48. $[\alpha]_D^{25} = +65°$ (1% in $H_2O$).

EXAMPLE 6

An appropriate reaction vessel is charged with 23 grams (0.05 moles) of 7(S)-chloro-7-deoxylincomycin hydrochloride (prepared according to Preparation I. (B) of U.S. Pat. 3,435,025) and 100 ml. of n-hexanol. The mixture is stirred continually while 8 ml. of bromine is added dropwise thereto over a period of about ten minutes. After standing at a temperature of about 25° C. for about 18 hours, excess n-hexanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are dried over anhydrous magnesium carbonate and evaporated under vacuum and the residue is chromatographed on two kilograms of silica gel (Merck 0.05–0.2 mm.) using chloroform:methanol (6:1 v./v.) as the eluting solvent system. Product fractions of 55 ml. each are collected. Fractions No. 66 through No. 86 are combined and evaporated under vacuum. The residue which is hexyl 7(S)-chloro-6,7,8-trideoxy-6-(1-methyl-trans-4-pyropyl - L - 2-pyrrolidinecarboxamido)-L-threo - α - D - galacto - octopyranoside free base, is then dissolved in about one liter of ether and gaseous hydrogen chloride is bubbled into the resulting solution. A precipitate appears which is removed by filtration and dried to obtain 6.0 grams (22 percent of theory) of hexyl 7(S)-chloro-6,7,8-trideoxy-6-(1-methyl-trans-4-propyl - L - 2 - pyrrolidinecarboxamido) - L-threo-α-D-galacto-octopyranoside in the form of its hydrochloride salt.

*Analysis.*—Calc'd for $C_{23}H_{43}ClN_2O_6 \cdot HCl$ (percent): C, 53.58; H, 8.6; N, 5.44; Cl, 13.76. Found (percent): C, 53.34; H, 8.86; N, 5.80; Cl, 13.88. $[\alpha]_D^{25} = +18°$ (1% in $H_2O$).

Similarly, repeating the above procedure but replacing the 7(S)-chloro-7-deoxylincomycin hydrochloride as used therein with an equal molar proportion of 1'-(2-hydroxyethyl)-1'-demethylclindamycin (prepared according to the method of Example 1 in copending application Ser. No. 156,099 filed June 23, 1971) and of 1'-hydro-1'-demethyl-cylindamycin (prepared according to the method of U.S. Pat. 3,435,025), respectively; there is obtained hexyl 7(S)-chloro-6,7,8-trideoxy-6-[1-(2 - hydroxyethyl) - trans - 4-propyl-L-2-pyrrolidinecarboxamido] - L - threo - α - D-galacto-octopyranoside free base and hexyl 7(S)-chloro-6,7,8-trideoxy-6-(1-hydro - trans - 4 - propyl-L-2-pyrrolidinecarboxamido) - L - threo - α - D - galacto - octopyranoside free base, respectively, and the corresponding hydrochloride salts, respectively.

EXAMPLE 7

An appropriate reaction vessel is charged with 23 grams (0.05 moles) of 7(S)-chloro-7-deoxylincomycin hydrochloride (prepared according to Preparation I. (B) of U.S. Pat. 3,435,025) and 100 ml. of 1-octanol. The mixture is stirred continually while 8 ml. of bromine is added dropwise thereto over a period of about ten minutes. After standing for thirty minutes at a temperature of about 25° C., excess n-octanol is removed by distillation under reduced atmospheric pressure and the residue which is n-octyl 7(S)-chloro-6,7,8-trideoxy - 6 - (1-methyl-trans-4-propyl - L - 2 - pyrrolidinecarboxamido)-L-threo-α-D-galacto-octopyranoside free base, is then triturated with two liters of Skellysolve B.[1] The insoluble material is separated and dissolved in 400 ml. of water. The pH of the resulting solution is adjusted to 2.0 by the addition of concentrated hydrochloric acid and the solution then extracted with chloroform. The chloroform extracts are evaporated to dryness under vacuum to yield 0.5 grams of n-octyl 7(S) - chloro-6,7,8-trideoxy-6-(1-methyl-trans-4-propyl - L - 2 - pyrrolidinecarboxamido - L - threo-α-D-galacto-octopyranoside in the form of its hydrochloride salt. The mass spectrum and the nuclear magnetic resonance spectrum are in agreement with those expected for the product compound.

Similarly, following the above procedure but replacing the n-octanol as used therein with an equal molar proportion of n-dodecanol, there is obtained n-dodecyl 7(S)-chloro-5,7,8-trideoxy - 6 - (1-methyl-trans-4-propyl-L-2-pyrrolidinecarboxamido) - L - threo - α - D - galactooctopyranoside free base and the hydrochloride salt thereof.

EXAMPLE 8

An appropriate reaction vessel is charged with 23 grams (0.05 moles) of 7(S)-chloro-7-deoxylincomycin hydrochloride (prepared according to Prepartion I. (B) of U.S. Pat. 3,435,025) and 100 ml. of 1-decanol. The mixture is stirred continually while 8 ml. of bromine is added dropwise thereto over a period of about ten minutes. After standing at a temperature of about 25° C. for about 18 hours, excess n-decanol is removed by distillation under reduced atmospheric pressure and the residue dissolved in 500 ml. of water. The resulting aqueous solution is adjusted to a pH circa 7.0 by the addition of sodium bicarbonate and then extracted once with 500 ml. of chloroform. The extract is evaporated under vacuum and the residue chromatographed on two kilograms of silica gel (Merck 0.05–0.2 mm.) using chloroform:methanol (6:1 v./v.) as the eluting solvent system. Product fractions of 50 ml. each are collected. Fractions No. 70 through No. 83 are combined and evaporated under vacuum. The residue which is n-decyl 7(S)-chloro-6,7,8-trideoxy-6-(1-methyl-trans-4-propyl - L - 2 - pyrrolidinecarboxamido-L-threo-α-D-galacto-octopyranoside free base, is then dissolved in about 500 ml. of ether and gaseous hydrogen chloride is bubbled into the solution. A precipitate appears which is removed by filtration and dried to obtain 10 grams (35 percent of theory) of n-decyl 7(S)-chloro-6,7, 8-trideoxy-6-(1-methyl-trans-4-propyl - L - 2 - pyrrolidinecarboxamido) - L - threo - α - D - galacto-octopyranoside in the form of its hydrochloride salt.

*Analysis.*—Calc'd for $C_{27}H_{51}ClN_2O_6 \cdot HCl$ (percent): C, 56.73; H, 9.17; N, 4.90; Cl, 12.41. Found (percent): C, 55.55; H, 8.99; N, 4.93; Cl, 12.27. $[\alpha]_D^{25} = +11°$ (1% in $H_2O$).

EXAMPLE 9

An appropriate reaction vessel is charged with 23 grams (0.05 moles) of 7(S)-chloro-7-deoxylincomycin hydro- ---
[1] Essentially n-hexane, B.P. 60° C.; Skelly Oil Company.

chloride (prepared according to Preparation I. (B) of U.S. Pat. 3,435,025) and 100 ml. of 2-phenylethanol. The mixture is stirred continually while 8 ml. of bromine is added dropwise thereto over a period of about ten minutes. After standing for two hours at a temperature of about 25° C., excess 2-phenylethanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are evaporated under vacuum and the residue is chromatographed on two kilograms of silica gel (Merck 0.05–0.2 mm.) using ethyl acetate:acetone:$H_2O$ (8:5:1 v./v./v.) as the eluting solvent system. Product fractions of 60 ml. each are collected. Fractions No. 69 through No. 85 are combined and evaporated under vacuum. The residue which is 2-phenylethyl 7(S)-chloro-5,7,8-trideoxy-5-(1-methyl - trans - 4 - propyl-L-2-pyrrolidine-carboxamido) - L - threo - α - D - galacto-octopyranoside free base, is then dissolved in about one liter of ether and gaseous hydrogen chloride is bubbled into the resulting solution. A precipitate appears which is removed by filtration and dried to obtain 10.5 grams (39 percent of theory) of 2-phenylethyl 7(S)-chloro-6,7,8-trideoxy-6-(1-methyl-trans-propyl - 2 - pyrrolidinecarboxamido) - L-threo-α-D-galacto-octopyranoside in the form of its hydrochloride salt.

Analysis.—Calc'd for $C_{25}H_{39}ClH_2O_6 \cdot HCl$ (percent): C, 56.07; H, 7.53; N, 5.23; Cl, 13.24. Found (percent): C, 54.47; H, 8.03; N, 5.14; Cl, 13.18. $[\alpha]_D^{25} = +27°$ (1% in $H_2O$).

Similarly, repeating the above procedure, but replacing the 2-phenylethanol as used therein with each of the following alcohols of formula (III): phenol, p-bromophenol, m-nitrophenol, p-aminophenol, p-chlorobenzyl alcohol, m-nitrobenzyl alcohol, p-aminobenzyl alcohol and p-hydroxybenzyl alcohol, respectively, there is obtained phenyl 7(S)-chloro-6,7,8-trideoxy-6-(1-methyl-trans-4-propyl-L-2-pyrrolidinecarboxamido)-L-threo-α-D-galacto-octopyranoside;
p-bromophenyl 7(S)-chloro-6,7,8-trideoxy-6-(1-methyl-trans-4-propyl-L-2-pyrrolidinecarboxamido)-L-threo-α-D-galacto-octopyranoside;
m-nitrophenyl 7(S)-chloro-6,7,8-trideoxy-6-(1-methyl-trans-4-propyl-L-2-pyrrolidinecarboxamido)-L-threo-α-D-galacto-octopyranoside;
p-aminophenyl 7(S)-chloro-6,7,8-trideoxy-6-(1-methyl-trans-4-propyl-L-2-pyrrolidinecarboxamido)-L-threo-α-D-galacto-octopyranoside;
p-chlorobenzylyl 7(S)-chloro-6,7,8-trideoxy-6-(1-methyl-trans-4-propyl-L-2-pyrrolidinecarboxamido)-L-threo-α-D-galacto-octopyranoside;
m-nitrobenzylyl 7(S)-chloro-6,7,8-trideoxy-6-(1-methyl-trans-4-propyl-L-2-pyrrolidinecarboxamido)-L-threo-α-D-galacto-octopyranoside;
p-aminobenzylyl 7(S)-chloro-6,7,8-trideoxy-6-(1-methyl-trans-4-propyl-L-2-pyrrolidinecarboxamido)-L-threo-α-D-galacto-octopyranoside;
p-hydroxybenzylyl 7(S)-chloro-6,7,8-trideoxy-6-(1-methyl-trans-4-propyl-L-2-pyrrolidinecarboxamido)-L-threo-α-D-galacto-octopyranoside, respectively, and their respective hydrochloride salts.

EXAMPLE 10

An appropriate reaction vessel is charged with 23 grams (0.05 moles) of methyl 6,8-dideoxy-6-(trans-1-methyl-4-propyl-L-2-pyrrolidinecarboxamido)-1-thio - D - erythro-α-D-galacto-octopyranoside (lincomycin) hydrochloride (prepared according to U.S. Pat. 3,086,912) and 100 ml. of methanol. The mixture is stirred continually while 8 ml. of bromine is added dropwise thereto over a period of about ten minutes. After standing at a temperature of 25° C. for 18 hours, excess methanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are evaporated under vacuum and the residue is chromatographed on two kilograms of silica gel (Merck 0.05–0.2 mm.) using chloroform:methanol (6:1 v./v.) as the eluting solvent system. Product fractions of 55 ml. each are collected. Fractions No. 65 through No. 85 are combined and evaporated under vacuum. The residue which is methyl 6,8-dideoxy-6-(1-methyl-trans-4-propyl-L-2-pyrrolidine-carboxamido) - D - erythro-α-D-galacto-octopyranoside free base, is then dissolved in about one liter of ether and gaseous hydrogen chloride is bubbled into the resulting solution. A precipitate appears which is removed by filtration and dried to obtain 12.0 grams (54 percent of theory) of methyl 6,8-dideoxy-6-(1-methyl-trans - 4 - propyl-L - 2 - pyrrolidinecarboxamido)-D-erythro-α-D-galacto-octopyranoside in the form of its hydrochloride salt. The product structure is confirmed by nuclear magnetic resonance analysis.

EXAMPLE 11

An appropriate reaction vessel is charged with 23 grams (0.05 moles) of methyl 6,8-dideoxy-6-(trans-1-methyl-4-propyl-L-2-pyrrolidinecarboxamido)-1-thio-D-erythro - α-D-galacto-octopyranoside hydrochloride (prepared according to U.S. Pat. 3,086,912) and 100 ml. of 2-phenylethanol. The mixture is stirred continually while 8 ml. of bromine is added dropwise thereto over a period of about ten minutes. After standing at a temperature of about 25° C. for about 18 hours, excess 2-phenylethanol is removed by distillation under reduced atmospheric pressure and the residue dissolved in 500 ml. of water. The resulting aqueous solution is extracted with ether and the aqueous phase adjusted to a pH circa 7.0 by the addition of sodium bicarbonate. The resulting neutral solution is extracted three times with 100-ml. portions of chloroform. The combined extracts are evaporated under vacuum and the residue is chromatographed on two kilograms of silica gel (Merck 0.05–0.2 mm.) using chloroform:methanol (6:1 v./v.) as the eluting solvent system. Product fractions of 60 ml. each are collected. Fractions No. 69 through No. 79 are combined and evaporated under vacuum. The residue which is 2-phenylethyl 6,8-dideoxy-6-(1-methyl-trans - 4 - propyl-2-pyrrolidinecarboxamido)-D-erythro-α-D-galacto-octopyranoside free base, is then dissolved in about one liter of ether and gaseous hydrogen chloride is bubbled into the resulting solution. A precipitate appears which is removed by filtration and dried to obtain 2-phenylethyl 6,8 - dideoxy-6-(1-methyl-trans-4-propyl-L-2-pyrrolidine-carboxamido) - D - erythro-α-D-galacto-octopyranoside in the form of its hydrochloride salt.

Analysis.—Calc'd for $C_{25}H_{40}N_2O \cdot HCl$ (percent): C, 58.07; H, 7.99; N, 5.42; Cl, 6.86. Found (percent): C, 58.62; H, 8.16; N, 5.67; Cl, 7.55. $[\alpha]_D^{25} = +40°$ (1% in $H_2O$).

Similarly, repeating the above procedure but replacing the 2-phenylethanol as used therein with 3- hydroxypyrrolidine, 3 - hydroxytetrahydrofuran, 3 - hydroxytetrahydrothiophene, 1-methyl - 3 - hydroxypiperidine, 4-hydroxytetrahydropyran and 4-hydroxytetrahydrothiopyran, respectively, there is obtained 3-pyrrolidinyl-;
tetrahydro-3-furyl-;
tetrahydro-3-thienyl-;
1-methyl-3-piperidyl-;
tetrahydro-4-pyranyl-; and
tetrahydro-4-thiopyranyl-6,8-dideoxy-6-(1-methyl-trans- 4-propyl-L-2-pyrrolidinecarboxamide)-D-erythro-α-D-galacto-octopyranoside, respectively, and their respective hydrochloride salts.

What is claimed is:

1. A compound selected from those of formula:

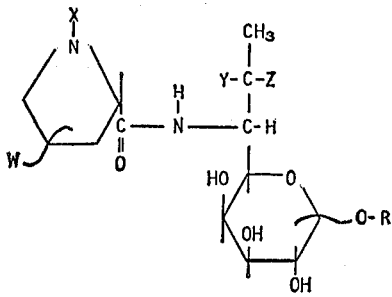

and the acid addition salts thereof, wherein W is selected from hydrogen and lower alkyl; X is selected from hydrogen, lower alkyl and hydroxy-substituted alkyl of from two to four carbon atoms, inclusive; Y is selected from hydrogen and hydroxyl; Z is hydrogen when Y is hydroxyl and when Y is hydrogen Z is selected from hydrogen, chlorine, bromine, and iodine; R is selected from lower alkyl, lower cycloalkyl, lower aryl, lower aralkyl, halo-substituted lower alkyl; halo-, nitro-, and amino-substituted lower aryl; halo-, nitro, amino- and hydroxy-substituted lower aralkyl; and a monovalent moiety of formula:

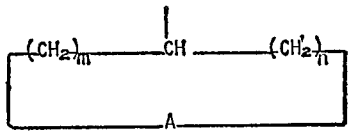

wherein A represents one of the divalent groups

—S—, and —O—; m and n are each integers of from 0 to 4, inclusive, and are such that the sum of m+n is from 3 to 4.

2. A compound selected from those of formula:

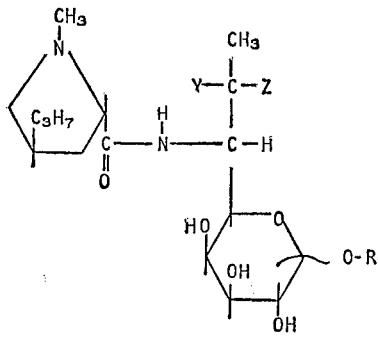

and the acid addition salts thereof, wherein Y is selected from hydrogen and hydroxy; Z is hydrogen when Y is hydroxyl and when Y is hydrogen Z is selected from chlorine, bromine and iodine; R is selected from lower alkyl, halogen-substituted lower alkyl, and lower aralkyl.

3. A compound according to claim 2, wherein R is selected from alkyl, halogen-substituted alkyl and aralkyl, each of which contains from 6 to 8 carbon atoms, inclusive.

4. A compound according to claim 2 which is methyl 7(S) - chloro-6,7,8-trideoxy-6-(1-methyl-trans-4-propyl-L-2-pyrrolidinecarboxamido) - L - threo-α-D-galacto-octopyranoside.

5. A compound according to claim 2 which is ethyl 7(S) - chloro-6,7,8-trideoxy-6-(1-methyl-trans-4-propyl-L-2-pyrrolidinecarboxamido)-L-threo - α - D-galacto-octopyranoside.

6. A compound according to claim 2 which is 2-chloroethyl 7(S)-chloro - 6,7,8 - trideoxy-6-(1-methyl-trans-4-propyl - L - 2-pyrrolidinecarboxamido)-L-threo-α-D-galacto-octopyranoside.

7. A compound according to claim 2 which is n-butyl 7(S)-chloro - 6,7,8 - trideoxy-6-(1-methyl-trans-4-propyl-L - 2 - pyrrolidinecarboxamido) - L - threo-α-D-galacto-octopyranoside.

8. A compound according to claim 2 which is isobutyl 7(S) - chloro-6,7,8-trideoxy-6-(1-methyl-trans-4-propyl-L-threo-α-D-galacto-octopyranoside.

9. A compound according to claim 2 which is n-hexyl 7(S)-chloro - 6,7,8 - trideoxy-6-(1-methyl-trans-4-propyl-L - 2 - pyrrolidinecarboxamido) - L - threo-α-D-galacto-octopyranoside.

10. A compound according to claim 2 which is n-octyl-7(S)-chloro - 6,7,8 - trideoxy-6-(1-methyl-trans-4-propyl - L-2-pyrrolidinecarboxamido-L-threo-α-D-galacto-octopyranoside.

11. A compound according to claim 2 which is n-decyl 7(S)-chloro - 6,7,8 - trideoxy-6-(1-methyl-trans-4-propyl-L - 2 - pyrrolinencarboxamido)-L-threo-α-D-galacto-octopyranoside.

12. A compound according to claim 2 which is 2-phenylethyl 7(S)-chloro-6,7,8-trideoxy-6-(1-methyl - trans - 4-propyl-L-2-pyrrolidinecarboxamido) - L - threo-α-D-galactooctopyranoside.

13. A compound according to claim 2 which is methyl 6,8-dideoxy-6-(1-methyl - 4 - propyl - L - 2-pyrrolidinecarboxamido)-D-erythro-α-D-galacto-octopyranoside.

14. A compound according to claim 2 which is 2-phenylethyl - 6,8 - dideoxy-6-(1-methyl-trans-4-propyl-L-2-pyrrolidinecarboxamido)-D-erythro-α-D-galacto - octopyranoside.

15. A compound according to claim 2 which is 2-chloroethyl-7(S)-chloro-6,7,8-trideoxy - 6 - (1 - methyl - trans-4-propyl-L-2-pyrrolidinecarboxamido) - L - threo-β-D-galacto-octopyranoside.

16. A compound according to claim 2 which is the hydrochloride salt of methyl 7(S)-chloro-6,7,8-trideoxy-6-(1-methyl - trans - 4 - propyl-L-2-pyrrolidinecarboxamido)-L-threo-α-D-galacto-octopyranoside.

17. A compound according to claim 2 which is the hydrochloride salt of ethyl 7(S)-chloro-6,7,8-trideoxy-6-(1 - methyl-trans-4-propyl-L-2-pyrrolidinecarboxamido)-L-threo-α-D-galacto-octopyranoside.

18. A compound according to claim 2 which is the hydrochloride salt of 2 - chloroethyl 7(S)-chloro-6,7,8-trideoxy-6-(1-methyl-trans - 4 - propyl-L-2-pyrrolidinecarboxamido)-L-threo-α-D-galacto-octopyranoside.

19. A compound according to claim 2 which is the hydrochloride salt of n-butyl 7(S)-chloro-6,7,8-trideoxy-6-(1-methyl - trans - 4 - propyl-L-2-pyrrolidinecarboxamido)-L-threo-α-D-galacto-octopyranoside.

20. A compound according to claim 2 which is the hydrochloride salt of isobutyl 7(S)-chloro-6,7,8-trideoxy-6-(1-methyl - trans - 4 - propyl-L-2-pyrrolidinecarboxamido)-L-threo-α-D-galacto-octopyranoside.

21. A compound according to claim 2 which is the hydrochloride salt of n-hexyl 7(S)-chloro-6,7,8-trideoxy-6-(1-methyl - trans - 4 - propyl-L-2-pyrrolidinecarboxamido)-L-(threo-α-D-galacto-octopyranoside.

22. A compound according to claim 2 which is the hydrochloride salt of n-octyl 7(S)-chloro-6,7,8-trideoxy-6-(1-methyl - trans - 4 - propyl-L-2-pyrrolidinecarboxamido)-L-threo-α-D-galacto-octopyranoside.

23. A compound according to claim 2 which is the hydrochloride salt of n-decyl 7(S)-chloro-6,7,8-trideoxy-6-(1-methyl - trans - 4 - propyl-L-2-pyrrolidinecarboxamido)-L-threo-α-D-galacto-octopyranoside.

24. A compound according to claim 2 which is the hydrochloride salt of 2-phenylethyl 7(S)-chloro-6,7,8-trideoxy-6-(1-methyl-trans - 4 - propyl-L-2-pyrrolidinecarboxamido)-L-threo-α-D-galacto-octopyranoside.

25. A compound according to claim 2 which is the hydrochloride salt of methyl 6,8 - dideoxy-6-(1-methyl-trans - 4 - propyl-L-pyrrolidinecarboxamido)-D-erythro-α-D-galacto-octopyranoside.

26. A compound according to claim 2 which is the hydrochloride salt of 2 - phenylethyl 6,8-dideoxy-6-(1-methyl-trans - 4 - propyl-L-2-pyrrolidinecarboxamido)-D-erythro-α-D-galacto-octopyranoside.

27. A compound according to claim 2 which is the hydrochloride salt of 2-chloroethyl 7(S)-chloro-6,7,8-trideoxy-6(1-methyl - trans - 4 - propyl-L-2-pyrrolidinecarboxamido)-L-threo-β-D-galacto-octopyranoside.

References Cited
UNITED STATES PATENTS

| | | | |
|---|---|---|---|
| 3,418,414 | 12/1968 | Houtman | 260—210 R |
| 3,723,617 | 3/1973 | Sutton | 260—210 R |

JOHNNIE R. BROWN, Primary Examiner

U.S. Cl. X.R.

424—180

UNITED STATES PATENT OFFICE
CERTIFICATE OF CORRECTION

Patent No. 3,849,396                     Dated  November 19, 1974

Inventor(s)  Robert D. Birkenmeyer

It is certified that error appears in the above-identified patent and that said Letters Patent are hereby corrected as shown below:

Column 1, line 48, for "1-demthyl-" read -- 1-demethyl- --.
Column 2, line 6, for "hydrozen" read -- hydrogen --.
Column 5, line 70, for "additttion" read -- addition --.
Column 6, line 63, for "crica" read -- circa --.  Column 7, line 72, for "pyrrolidinecarboxyamido" read -- pyrrolidinecarboxamido --.  Column 9, line 48, for "pyropyl" read -- propyl --.  Column 10, line 75, for " ι 60º C.;" read --  ι 60º C. to 68º C.; --.  Column 12, line 50, for "propyl-2" read -- propyl-L-2 --.  Column 13, line 1, for "pyrrolidinecarboxamide" read -- pyrrolidinecarboxamido --.  Column 14, line 26, claim 11, for "pyrrolinencarboxamido" read -- pyrrolidinecarboxamido --; Column 14, line 33, claim 13, for "methyl-4-" read -- methyl-trans-4- --.  Column 15, line 6, claim 25, for "propyl-L-" read -- propyl-L-2 --.

Signed and sealed this 27th day of May 1975.

(SEAL)
Attest:

RUTH C. MASON
Attesting Officer

C. MARSHALL DANN
Commissioner of Patents
and Trademarks